Dec. 19, 1939.   F. PORSCHE   2,183,940
VEHICLE WHEEL SUSPENSION
Filed Dec. 16, 1937
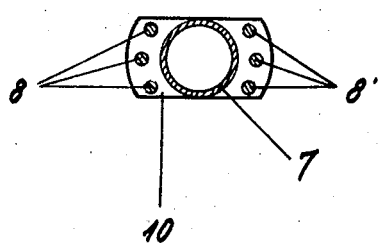
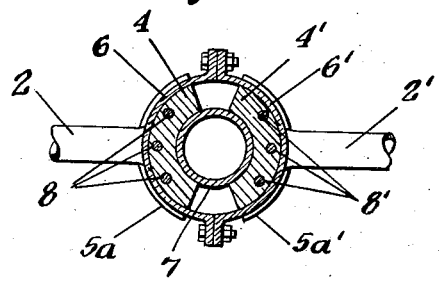
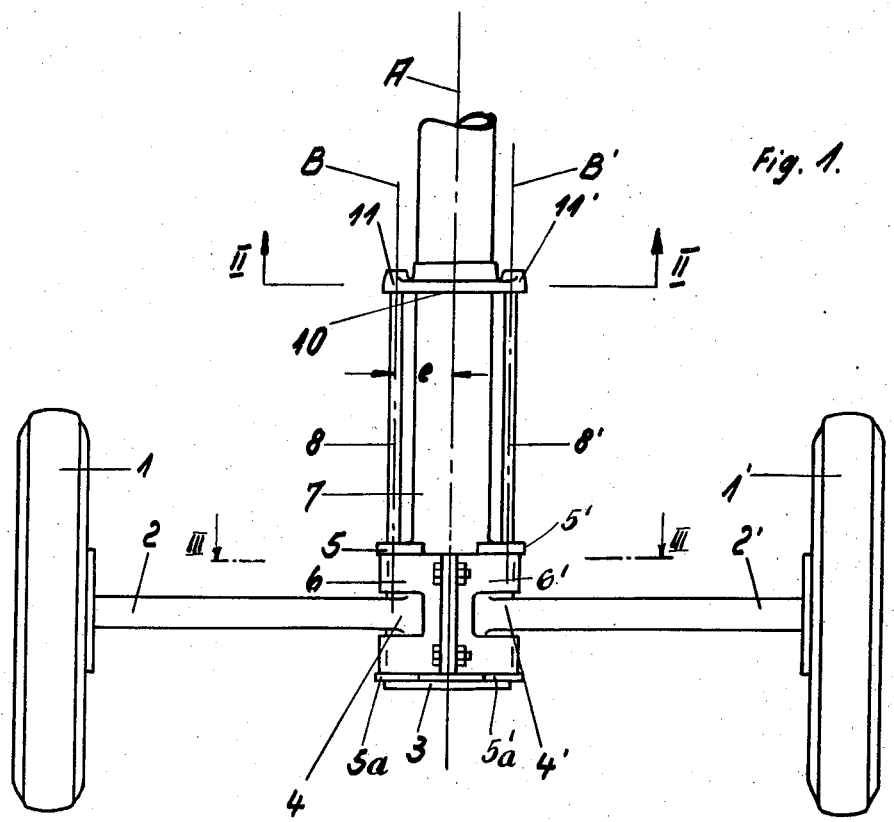
Inventor:
Ferdinand Porsche
Attorneys Patented Dec. 19, 1939

2,183,940

UNITED STATES PATENT OFFICE 2,183,940

VEHICLE WHEEL SUSPENSION

Ferdinand Porsche, Stuttgart, Germany, assignor to Dr. Ing. h. c. F. Porsche, K.-G., Stuttgart-Zuffenhausen, Germany, a company of Germany Application December 16, 1937, Serial No. 180,059
In Germany February 18, 1933

7 Claims. (Cl. 267—57)

An object of this invention is the provision of an improved arrangement for springing the wheels of a vehicle relative to the frame.

Another object of this invention is an improved arrangement of torsional springing means for resiliently resisting motion of the wheels of a vehicle relative to the frame.

A further object of this invention is the provision of a torsional springing arrangement for the wheels of a vehicle wherein the springs lie parallel to the theoretical swinging axis of the wheels.

A still further object of this invention is the provision of an improved wheel suspension for vehicles in which the unsprung weights and spring inertia forces are reduced to a minimum.

Other objects will appear from the following description of an illustrative embodiment of the invention taken together with the attached drawing wherein:

Fig. 1 is a plan view of my improved wheel suspension;

Fig. 2 is a cross sectional view taken along the line II—II in Fig. 1; and

Fig. 3 is a cross sectional view taken along the line III—III of Fig. 1.

As illustrated in the accompanying drawing the wheels 1, 1' of the vehicle are supported upon the outer ends of the respective axle tubes to 2' which in turn at their inner ends have cylindrical bushings 4, 4' preferably integrally connected therein. A split casing 6 held together by any suitable means, is used to hold the bushings 4, 4' in rotatable engagement upon a central circular frame member 7, shown in the preferred embodiment as a tubular frame member which may form a housing for the drive shaft (not shown). Collars 5 and 5a on the bushing 4 and collars 5' and 5'a on the bushing 4' cooperate with the casing 6 and the axle casing 3, preferably connected at the end of the frame member 7, to hold the bushings against longitudinal movement on the frame. By means of the foregoing arrangement the wheels 1 and 1' are, therefore, adapted to swing about the axis A of the frame member, this frame member acting as a journal for the bushings of the swinging half axles.

In order to resist the swinging movement of the wheels a plurality of torsion bars 8 are attached against rotation to the bushing 4 and a plurality of torsion bars 8' are attached to the bushing 4'. A collar or other transverse supporting member 10 is rigidly attached to the frame in any suitable manner and the ends of the torsion bars 8 and 8' are held against rotation in eyes 11 of the member 10. The axis of rotation of the spring members 8 is indicated as at B while that of the spring members 8' is indicated as B'. It will thus be noted that there is a distance $e$ between the axis of rotation of the wheels and the axis of rotation of the torsion springs. Upon rotation of the swinging members this brings into play, not only a torsional stress upon the spring rods, but a bending stress as well.

It will thus be seen that upon movement of the axle tube 2 due to any unevenness of the road acting upon the wheel, the tube 2 will rotate on its bushing 4 about the frame member 7. Such rotation will be transmitted to the torsion springs 8 which, due to the resulting twisting and bending thereof, will tend to resist the motion of the wheel. An exceedingly simple and effectively springing results from this arrangement.

Because of the slight distance $e$ between the axis of rotation of the swinging wheel and the axis of rotation of the torsion bar the bending which takes place in the torsion bar is as a practical matter extremely slight, so that there will be a direct relationship between the amount of vertical wheel movement and the amount of spring twist.

Attention is directed to the fact that while I have indicated the use of three torsion springs on each side of the vehicle, my invention is not intended to be limited to this number, but the number of springs can be varied in accordance with the knowledge of those skilled in the art depending upon the size of the spring and the load which the vehicle is required to carry.

The invention as illustrated contemplates the use of wheel driving means within the axle tubes 2, 2', but the scope of this invention is entirely independent of whether or not such driving means are actually used.

The words "frame" or "chassis" as used throughout the specification and claims is to be understood as not limited to a frame or chassis independent of the body or coachwork of the vehicle, but to include such a frame or chassis secured to a part of or integral with the body or coachwork of the vehicle.

Finally, while the form of the invention here shown and described is admirably adapted to fulfill the objects primarily stated, it is to be understood that it is not intended to confine the invention to the one form of embodiment herein described for it is susceptible of embodiment in various forms all coming within the scope of the claims which follow.

I claim:

1. In a vehicle, a central longitudinal circular frame member, a lever, wheel supporting means on one end of said lever, a cylindrical bushing on the other end of said lever, means for holding said bushing for engagement with and rotation on said circular frame member, and spring means interconnected between said bushing and frame member for resisting rotation of said bushing.

2. The combination according to claim 1 in which said spring means includes a torsion bar.

3. The combination according to claim 1 in which said spring means includes a torsion bar whose axis of rotation is substantially parallel to the axis of said frame member.

4. In a vehicle having a frame, including a central longitudinal circular frame member, a pair of levers, wheel supporting means on one end of each of said levers, a split cylindrical bushing on the other end of each of said levers, a casing surrounding said bushings for holding the same in engagement with and rotation on said circular frame member, and spring means interconnected between said bushing and said frame.

5. The combination according to claim 4 in which said spring means includes at least two torsion bars, one connecting one of said bushings to said frame and the other connecting the other of said bushings to said frame.

6. The combination according to claim 4 in which said spring means comprises two sets of torsion bars, one set connecting one of said bushings to said frame and the other set connecting the other of said bushings to said frame.

7. The combination according to claim 4 in which said spring means includes at least two torsion bars, one connecting one of said bushings to said frame and the other connecting the other of said bushings to said frame, the axis of rotation of said torsion bars being substantially parallel to each other and to the axis of said circular frame member.

FERDINAND PORSCHE.

CERTIFICATE OF CORRECTION.

Patent No. 2,183,940.  December 19, 1939.

FERDINAND PORSCHE.

It is hereby certified that error appears in the above numbered patent requiring correction as follows: In the heading to the printed specification, line 7 thereof, strike out "Application December 16, 1937, Serial No. 180,059" and insert instead the following -

Original application February 16, 1934, Serial No. 711,575.
Divided and this application December 16, 1937, Serial No. 180,059;'.

page 1, first column, line 1, before "An object" insert the following paragraph -

This application is a division of my co-pending application, Serial No. 711,575, filed February 16, 1934.;

and that the said Letters Patent should be read with this correction therein that the same may conform to the record of the case in the Patent Office.

Signed and sealed this 19th day of March, A. D. 1940.

(Seal)

Henry Van Arsdale,
Acting Commissioner of Patents.